(12) United States Patent
Suggs, Sr.

(10) Patent No.: US 6,965,324 B1
(45) Date of Patent: Nov. 15, 2005

(54) AUTOMOTIVE PICTURE AND DATA ACQUISITION CENTER AND METHOD

(75) Inventor: Robert W. Suggs, Sr., 4111 Medical Pkwy., Suite 210, Austin, TX (US) 78756-3726

(73) Assignee: Robert W. Suggs, Sr., Austin, TX (US)

(*) Notice: Subject to any disclaimer, the term of this patent is extended or adjusted under 35 U.S.C. 154(b) by 1062 days.

(21) Appl. No.: 09/693,733

(22) Filed: Oct. 21, 2000

(51) Int. Cl.[7] .............................................. G08G 1/01
(52) U.S. Cl. ...................................... 340/933; 348/148
(58) Field of Search ................................ 340/933–943; 701/117–9; 348/148–9

(56) References Cited

U.S. PATENT DOCUMENTS

| | | | |
|---|---|---|---|
| 4,855,770 A | | 8/1989 | Mauchan |
| 4,970,389 A | | 11/1990 | Danforth |
| 5,381,155 A | * | 1/1995 | Gerber ........................ 342/104 |
| 5,801,618 A | * | 9/1998 | Jenkins ................... 340/426.14 |
| 5,943,783 A | * | 8/1999 | Jackson ........................ 33/288 |
| 5,978,776 A | | 11/1999 | Seretti |
| 6,041,310 A | | 3/2000 | Green |
| 6,052,065 A | | 4/2000 | Glover |
| 6,052,631 A | | 4/2000 | Busch |
| 6,076,064 A | | 6/2000 | Rose |

* cited by examiner

Primary Examiner—Jeffery Hofsass
Assistant Examiner—George Bugg
(74) Attorney, Agent, or Firm—Michael P. Adams; Winstead Sechrest & MinicK P.C.

(57) ABSTRACT

An apparatus and method for the automatic or semi-automatic acquisition of multiple photographs and VIN-coded information about an automobile. In one embodiment, four height-adjustable, digital cameras are positioned on four corner posts defining a work center. A vehicle is pulled into the center until a stop indicator light is triggered, at which time an attendant scans the bar coded VIN number and reviews the proposed photographs of the vehicle at a work center computer. Once the photographs and data are acceptable, the attendant triggers a download of the information to local and industry databases. Alternate embodiments include Alternate embodiments include work centers with different post configurations, manual entry systems, and completely automated centers.

22 Claims, 10 Drawing Sheets

AUTOMOTIVE PICTURE AND DATA ACQUISITION CENTER AND METHOD

FIELD OF INVENTION

This invention relates to a processing station and method for the semi-automatic acquisition of photographs and descriptive data for automobiles and other vehicles.

BACKGROUND

Currently, vehicle databases typically incorporate information from a variety of sources including one or more photograph and specific information such as price, year, make, model, sub-model or 'series' (like 2001 Ford F-150 XL Lariat), engine, transmission, color, number of doors, features, equipment options, and accessories related to the vehicle.

The photographs are typically provided as a contract service where a contractor visits the car dealer and takes one or more pictures of the vehicles which are new to the dealer's lot within a given period of time. Typically, a contractor such as Dealer Specialties International or VIN Systems will also obtain each vehicle's VIN number (Vehicle Identification Number) and record the vehicle's visible characteristics and options. The contractor will then process the VIN information offsite and upload information to one or more databases such as that which may be found at getauto.com and other web sites. The contractor will then typically return to the dealer's lot with a window sticker for the vehicle. This service has evolved over the years from a window sticker service in an attempt to meet the demands for electronic availability of information. The most common use of vehicle information is to update Internet or shared databases where a buyer can, for instance, determine which automobiles are available through particular dealers. The information may also be re-entered into a dealer's internal database or software. Internal databases and software are typically used to support sales and accounting functions within a dealership.

The current data acquisition cycle usually takes several days, often 7–14 days, to complete, so the dealer may have incomplete information for that period of time, or the dealer may be limited in its ability to sell the vehicle online while the information is being processed. Objectives of the current invention include cutting the costs for acquiring vehicle information, and making that information available immediately available to the dealer and his sales network upon the dealer's receipt of a vehicle.

A further objective of the current invention is to facilitate the gathering of the information in a manner that is consistent with existing business operations.

With the current invention, a dealer or a single contractor can obtain, in a short period of time, information which currently originates from several sources. Another advantage of the current invention is to improve the quality and consistency of digital images used in the databases. A further advantage is to automatically load complete vehicle data into the dealer's back-office sales and accounting system.

In addition to the current data acquisition service procedures, the prior art includes specialized vehicle identification devices such as large transparent bar codes and radio frequency transmitters; and it includes networks of computers or specialized software to assist in a vehicle valuation, damage inspection, vehicle sales, etc. There is a need for an apparatus and method to support a more efficient gathering and consolidation of vehicle images and data.

U.S. Pat. No. 5,978,776 issued Nov. 2, 1999 to Seretti, et al, describes a vehicular data exchange system to permit auctioning and rapid determination of a sales price for a used vehicle. The Seretti patent claims multiple computer terminals, a processor, and an alarm device to alert an operator of responses to inquiries about a vehicle. U.S. Pat. No. 6,076,0649 issued Jun. 13, 2000 to Rose, describes a centralized system for tracking titles to motor vehicles and other property. An object of the present invention is to efficiently provide the information needed for electronic applications such as that described in the Seretti and Rose patents.

U.S. Pat. No. 4,970,389 issued Nov. 13, 1990 to Danforth, describes a stationary bar code reader mounted at a height that permits it to read a large bar code pattern on a vehicle windshield as a moving vehicle passes the reader. The bar code is preferably provided in the front windshield in a manner that is invisible to the human eye. An object of the present invention is to capture data and photographs of vehicles without requiring additional identification devices to be associated with the vehicle.

U.S. Pat. No. 6,052,631 issued Apr. 18, 2000 to Busch, et al. Describes an expert system based vehicle damage inspection system which includes receiving vehicle data. An object of the present invention is to provide a method and apparatus which allows the automation or semi-automation of the data acquisition process in order to provide lower cost, improved delivery time for information, and improved quality of information with respect to the prior art.

U.S. Pat. No. 4,855,770 issued Aug. 8, 1989 to Mauchan, et al. Describes a special camera for reading VIN numbers. An object of the current invention is to provide an economical system which can be assembled from widely-available components. U.S. Pat. No. 6,052,065 issued Apr. 18, 2000 to Glover describes a VIN reading and transmitting system for providing a device for automatically detecting a vehicle identification number through radio frequency devices and transmitting the number to a dispatch station for immediate identification of the vehicle and owner. An object of the present invention is to provide a vehicle information gathering capability that is compatible with various vehicle identification techniques.

U.S. Pat. No. 6,041,31065 issued Mar. 21, 2000 to Green, et al. describes an automobile sales kiosk that provides automobile data and images to customers. An object of the present invention is to enable an efficient gathering of vehicle information so that the information may be used to support all sales efforts.

SUMMARY

An apparatus and method are presented to facilitate the semi-automatic acquisition of multiple vehicle photographs and VIN-coded information about an automobile and to automatically pass this data to multiple onsite and offsite databases. In one embodiment, four height-adjustable digital cameras are positioned on the four corner posts defining a work center. A vehicle is pulled into the center until a stop indicator light is triggered, at which time an attendant bar code scans the VIN number and reviews the proposed photographs of the vehicle at a work center computer. Once the photographs and data are acceptable, the attendant triggers a transfer of the information to local and industry databases. Alternate embodiments include work centers with different post configurations, manual entry systems, and completely automated centers.

BRIEF DESCRIPTION OF THE DRAWINGS:

These and other objects and advantages of the present invention are set forth below and further made clear by reference to the drawings, wherein.

DETAILED DESCRIPTION OF EMBODIMENT

Figure 1:
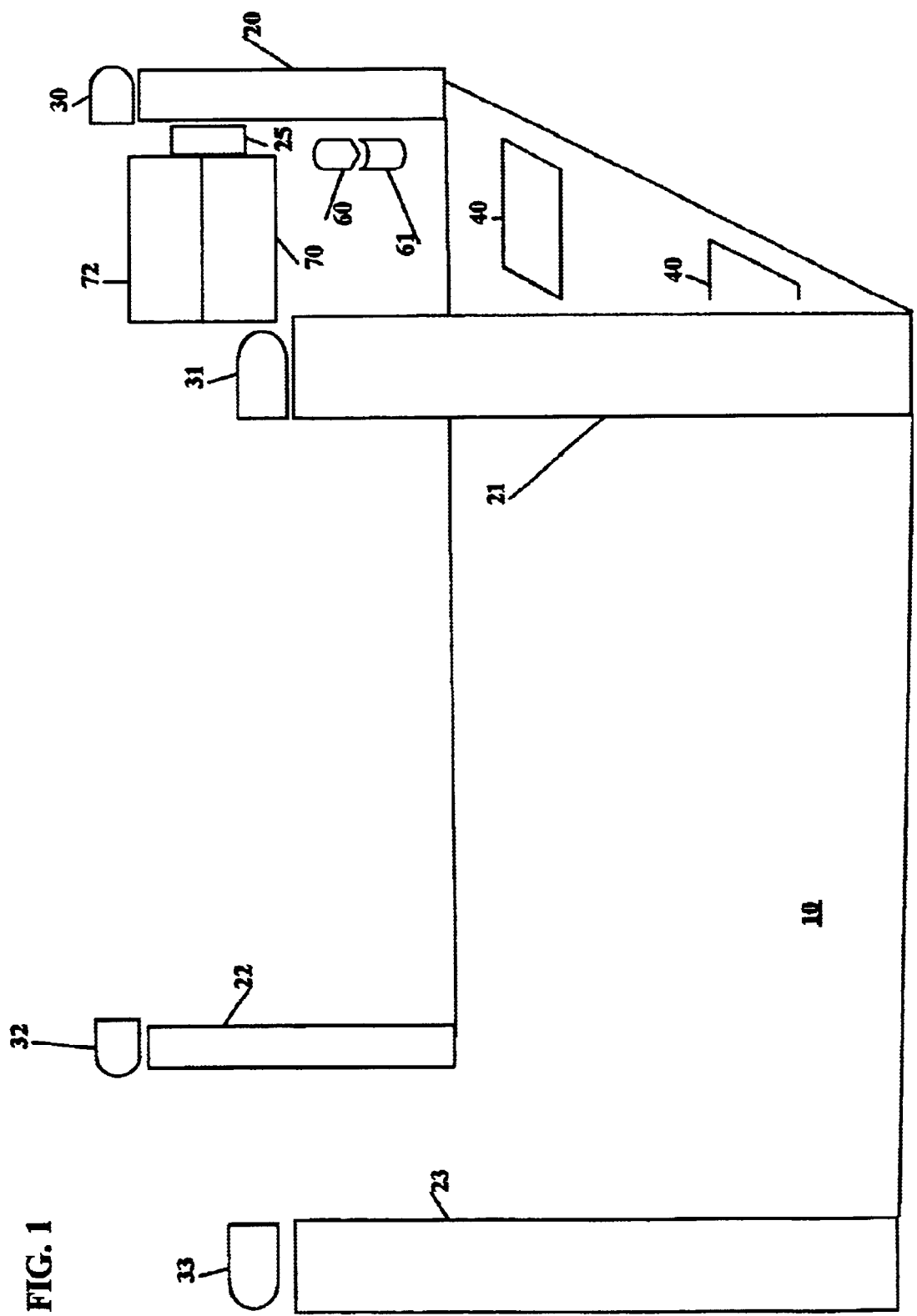
FIG. 1 is a perspective view showing four post-mounted cameras, a bar code scanner, and a computer workstation.

Referring now to FIG. 1, which is a perspective view of one embodiment of the current invention, the center is established within a rectangular work area 10 defined within four posts 20, 21, 22, and 23.

In this embodiment, a first post 20 supports a workstation platform 25 which holds a notebook computer docking station 71 for a notebook computer 70. In alternate embodiments, a second platform may be provided so that one platform supports a computer monitor, and the other platform supports a desktop computer. In other embodiments, a notebook computer may be used without a docking station.

The first post preferably includes an access panel which can be used to service the electrical and communications connections, so that the post can be configured to function alone, or to provide power and communications connections to one or more downstream posts. As shown in FIG. 1, post 20 provides connections to a second post 21 and to a third post 22. A fourth post 23, has electrical and communications connection provided through post 21, which has an access panel similar to post 20. The electrical connections are preferably provided through a conduit which houses an electrical supply and one or more signal cables which can carry a video signal, and, in some embodiments control signals for raising or lowering a post. In this manner, all posts may communicate with the computer positioned at post 20. In some applications, the conduit may be raised to permit persons to walk underneath it.

In this embodiment, the third and fourth posts 22 and 23 are generally placed near the rear of a vehicle, and these posts preferably have mounted wheels so that they may be easily repositioned to accommodate various sizes of vehicles. The conduit is preferably an adjustable length conduit, such as an inner sleeve sliding within a larger outer sleeve, so that the conduit will lengthen or shorten to accommodate various placements of the rear posts. Alternative connections such as retractable conduit may also be used to provide the necessary electrical connections. In alternate embodiments, the posts may be fixed.

The four posts and the conduit between the posts thus form a frame defining the vehicle work area. A vehicle is driven into the work area and parked when it comes into contact with stoppers 40. The stoppers are preferably movable so that they can be positioned according to the vehicle size in order to position the vehicle in an optimum location for the cameras 30, 31, 32, and 33 which are preferably mounted on the posts. The positioning may be performed manually by the operator such as according to various markings on the floor of the service area, or the positioning of the stopper may be performed automatically, such as through a motor controlled by the computer. Alternately, a stop light or other visual or sound indicator may be used in conjunction with a sensor such as an ultrasonic or optical path sensor in order to detect the position of the vehicle's tire or bumper and to cause a signal to be displayed so that the operator can position the vehicle appropriately.

Vertical positioning of the cameras is preferably accomplished by raising or lowering pole inserts. Alternately, the camera positioning may be changed by turning internal portions of the pole. The cameras are preferably live feed digital cameras so that the vehicle may be viewed on a computer monitor 51 as it enters the work area. In this embodiment, up to four (4) images may appear on the monitor from the cameras installed at the four corners of the work area. These images may be live streaming video feeds, or still shots which are preferably updated every few seconds. The images may also be obtained on demand by the operator pressing a keyboard key, or otherwise providing an instruction to the computer. The cameras are preferably have an autofocus capability. The operator may also manually adjust a camera's positioning and focus at the camera, or adjust the camera positioning via the computer terminal, or adjust the camera focus via the computer terminal. Preferably, each camera's focus may be adjusted from the computer 70, so that if the monitor 72 displays an image of unacceptable quality, then that camera focus may be adjusted. Following the adjustment, the operator may review the new image, and either accept the image, or repeat the process until an acceptable image is provided. In this case, the focus commands are communicated from the computer to the camera through a communication cable in the conduit or wirelessly.

The center attendant then takes a wireless bar scanner 60 from the bar scanner holder 61 located on pole 20 near the computer workstation. The scanner communicates to the computer through a wireless radio frequency connection to a port on the computer. Alternately, the scanner may be wired directly to a port on the computer. The bar scanner is preferably located next to the removable laptop computer 70 and its docking station 71. The bar code scanner is connected to a port on the docking station. The workstation may be provided with a second shelf to support a desktop computer if the customer prefers a desktop top a laptop or notebook computer. The scanner is preferably an IR barcode hand scanner with an RS232 serial interface.

The attendant scans the Vehicle Identification Number (VIN) bar code label. The computer receives VIN number, parses and decodes the VIN number, and displays vehicle and manufacturer information on the computer monitor 72, preferably next to the vehicle images on the display. The VIN may be analyzed via a connection to an Information Service Provider and the data and specifications about this vehicle may be returned to the computer terminal for review and edit by the Data Technician. The VIN may also be stored temporarily with no decoding.

The computer and scanner are preferably connected to a surge protection device such as a TripLite ISOBar Power Distributor/Surge Suppression device. The operator also has the capability of manually keying in the VIN number for pre-1982 vehicles, Mitsubishi vehicles, and other situations as necessary. Alternative input devices such as computer touch screens, hand-held computer devices, and keypads may also be used.

The computer program prompts the attendant to finish or to accept the data and to enter additional data via one or more menus provided in the software application, or through other selection and input methods. Comments and additional information such as vehicle condition, defects, etc, are then typed manually. Once the images are acceptable to the operator, the images, the VIN, and any edited data may be sent to an Information Service Provider.

Figure 9:
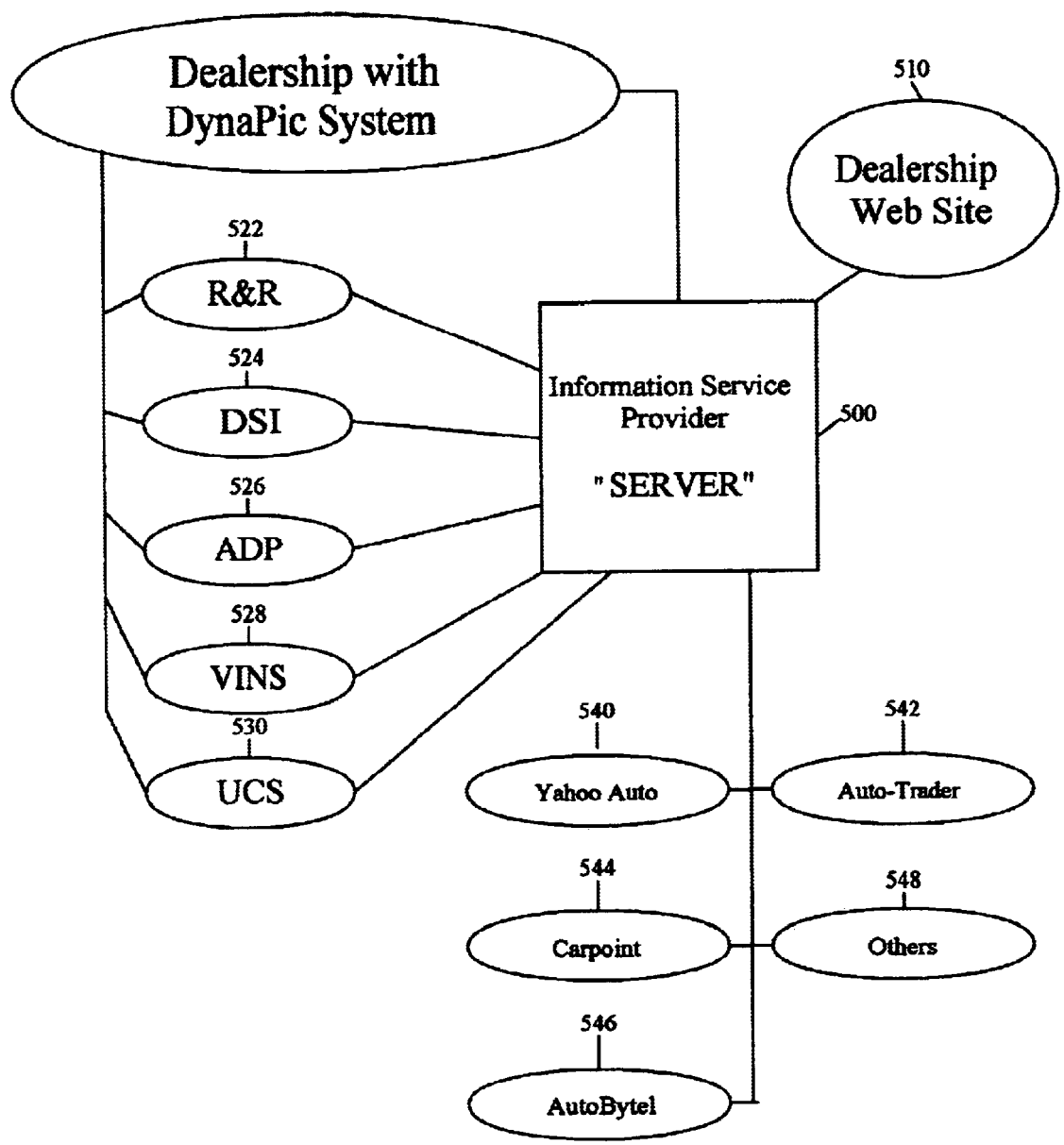
FIG. 9 is a schematic illustrating the data flow between entities.

Referring now to FIG. 9, the Information Service Provider 500 provides services such as this invention's application software to send, receive, collect, assimilate, and transfer data. The data is sent via an Internet connection, or Network connection, or Telephone Modem connection directly to a dealer's web site 510 to update the dealer's database. At this time, the data collected may also be sent via Local Area Network (LAN) connection within the dealership to its back-office sales and accounting systems such as those provided Reynolds & Reynolds 522, DSI 524, ADP 526, VINS 528, or UCS 530. The data is also typically sent to Internet trading or information sites such as Yahoo Auto 540, Auto-Trader 542, Carpoint 544, Autobytel 546, or other applications 548. These transfers may be initiated by pressing a key on a keyboard or keypad, by computer touch screen, by a wired or wireless hand-held device, or by other input mechanism. If additional information is necessary or desired, the attendant enters this information and hits the "enter" key. Again, the attendant is prompted to accept and finish. Once the data is sent, a confirmation message may be displayed, and the computer terminal may reset itself for a new vehicle to be processed, or may be shutdown by the operator.

Figure 2:
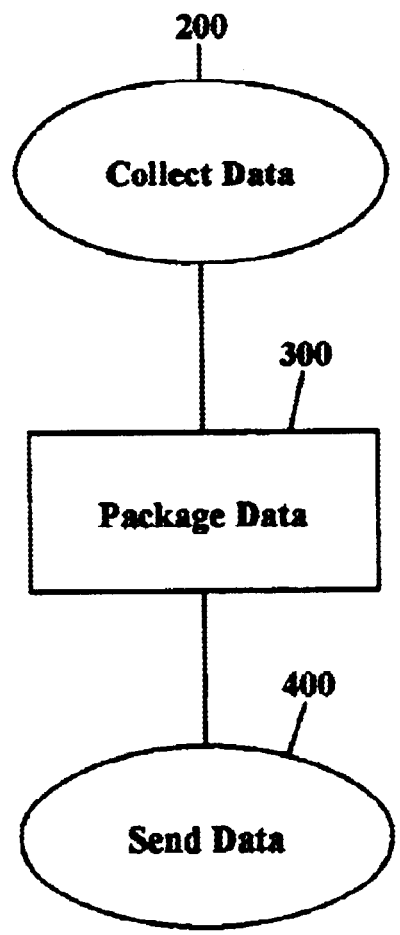
FIG. 2 is a flowchart of the major data collection steps.

Referring now to FIG. 2, which is a flowchart of the functions of the major data collection steps, the data is collected at step 200, packaged into one or more files in step 300, and then transmitted in step 400. The software platform preferably consists of a 16 bit, 32 bit, or higher operating system, providing basic kernel functionality, as well as simple command-line interface for Information Service Provider administration. The operating system is preferably based on an operating system such as DOS, WINDOWS, POSIX (Unix), or the Macintosh operating system. The software is preferably binary-compiled code, written in Assembly, C, C++, Java, Basic, Visual Basic, or Pascal. The software is preferably compiled to 16 bit, 32 bit, or higher, using Programming Libraries and Modules of the same bit measurement, determined by the operating system bit measurement. All normal Input and Output (I/O) is preferably handled by the kernel, operating system, and compiler event-handlers. The software uses Public Domain Programming Libraries and/or Modules specific to the compiler environment to provide input devices, graphic, video, and networking support. The Graphic Drawing and Video capabilities of the Software are preferably facilitated through EGA, VGA, or Super VGA modes at an on-screen palette of 16, 256, 32000, 64000, or 16000000 colors, and resolution of 320×200, 640×480, 800×600, 1024×768, 1280×1024, or 1600×1280. The Networking capabilities of the software are preferably facilitated using TCP/IP via Ethernet/Modem PPP with a Packet Driver, or alternatively, a TCP-Socket interface, provided by the kernel or operating system. Alternately, modem connections such as an ASCII BNC-thin-net/Modem with ASCII, Kermit, Xmodem, Ymodem, Zmodem, or other protocol may be used.

Figure 3:
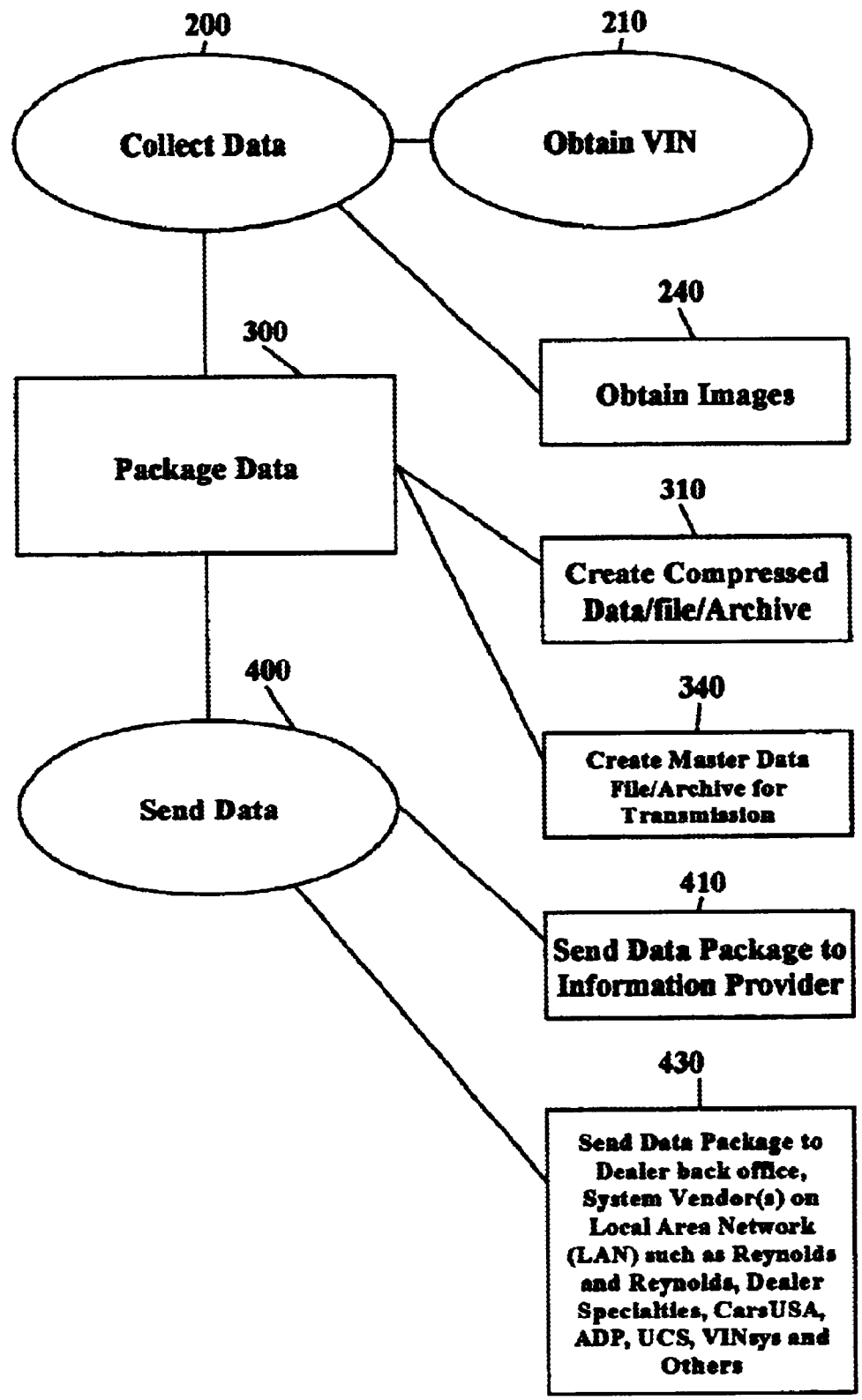
FIG. 3 is a detailed flowchart of the data collection step.

Referring now to FIG. 3, the data collection step 200 is comprised of obtaining the VIN 210 and obtaining images 240. The package data step 300 is comprised of creating a compressed Data File/Archive 310 and creating a Master Data File/Archive for Transmission 340. The send step 400 is typically comprised of sending data Package to the Information Service Provider(s) 410 and sending data to one or more Dealer Back Office System Vendor (or "3$^{rd}$-Party Vendor") on Local Area Network (LAN) 430 and to dealer's back office systems 460. Examples of 3$^{rd}$-Party Vendors include getauto.com, MicroSoft's carpoint.com, Yahoo!, classifieds, and autobytel.com.

Figure 4:
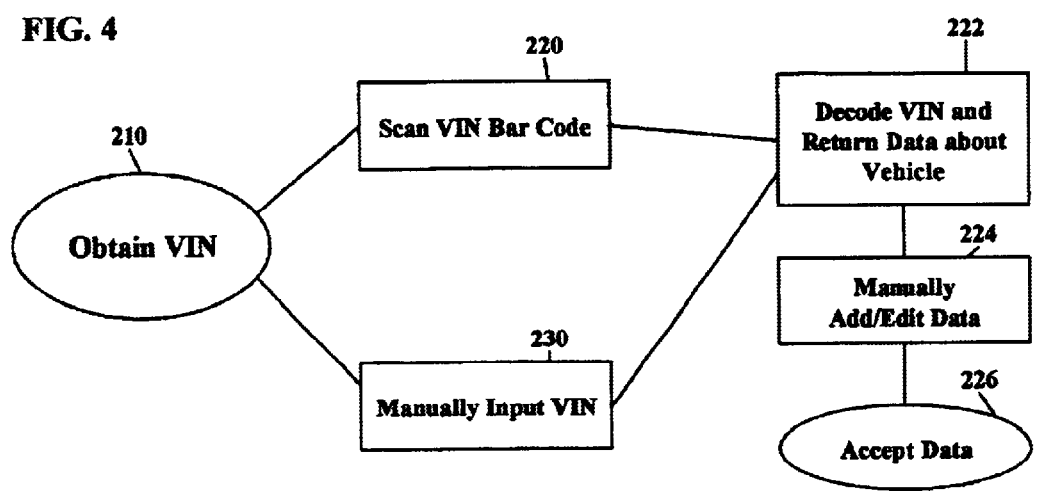
FIG. 4 is a detailed flowchart of the Obtain VIN step.
Figure 5:
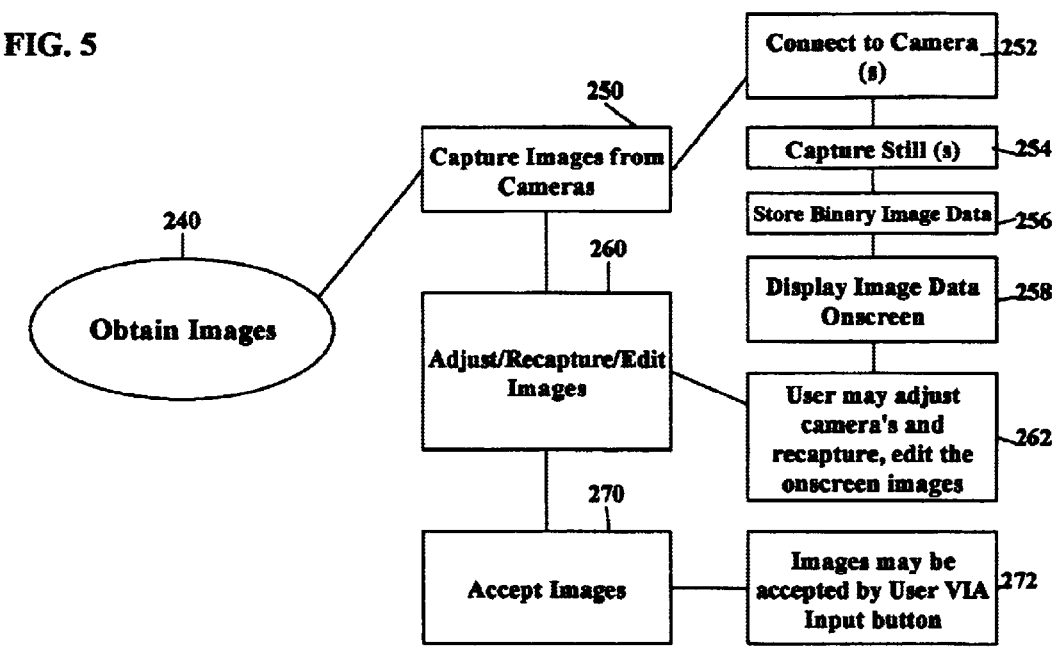
FIG. 5 is a detailed flowchart of the Obtain Images step.

Referring now to FIG. 4, the Obtain VIN step 200 may be accomplished by either automatic acquisition 220, such as with a bar code reader, or Manually Input VIN 230. Data Input is preferably achieved with a combination of devices. An infrared bar-code scanning device, conforming to ISO specifications may be used to facilitate quick entry of Vehicle Identification Numbers (VINs) equipped with bar codes on vehicles. The bar code scanning device may be wired to the computer terminal, or wireless with a base transceiver inside or outside the computer terminal. In cases where bar codes are not present on the vehicle, the VIN may be manually entered by the operator via a keyboard, keypad, or touch-screen. A keypad or keyboard may be wired to the computer terminal, or wireless with a base transceiver inside or outside the computer terminal. In the case of wireless devices, the bar code scanner and the keypad/keyboard may be one unit for ease of use. The VIN is then decoded and data regarding the vehicle is returned at step 222. The vehicle data may then be manually adjusted or edited 224, and then accepted 226. Referring now to FIG. 5, the Obtain Images step 240 is preferably accomplished by capturing images from cameras 250; adjusting and recapturing images or editing images if necessary at step 260, and accepting images at step 270. The images are preferably captured by a connection to a digital camera at step 252 and capturing a still at 254 which is displayed on the monitor at step 258. At step 262, the user may adjust the cameras, such as height or focus, and recapture an image as in steps 252 through 258. The images are typically accepted by the user with an input button in step 272. In this embodiment, the unit will require four (4) camera or video devices connected to the computer terminal via digital serial, parallel, null-modem, usb, scsi, 'firewire', or any mono-directional or bi-directional wires, depending upon camera operation requirements. The cameras use a charge couple device chip, BTTV, or other digitization (or DSP) chip(s) or video capture card to convert the visual data to digital data for transmission to the computer terminal. The digitized image information is transmitted to the computer terminal via a proprietary scheme set by the camera manufacturer, and is typically processed with a digital video capture card. Reception and decoding of the camera data is facilitated by specification libraries provided by the camera manufacturer. A standardized binary array is achieved from the specification libraries. The binary array may be saved into BMP, JPG, or any Public Domain format as a file, or manipulated by the Software for visual display to the operator. The binary array may be saved into BMP, JPG, or any Public Domain format as a file, or manipulated into the communication data set for transmission to the Information Service Provider.

Figure 6:
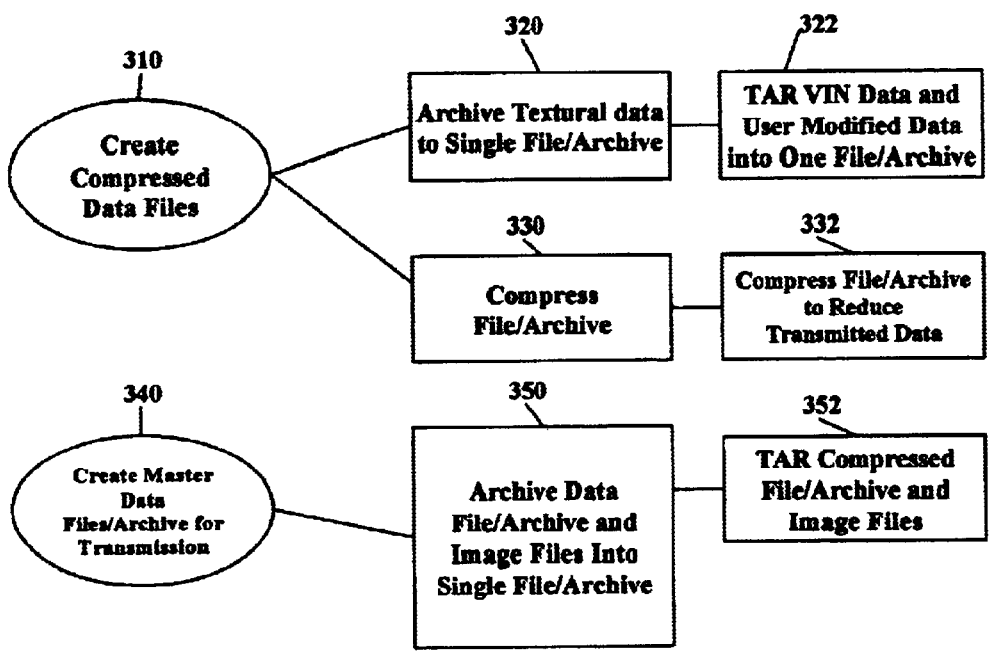
FIG. 6 is a detailed flowchart of the Create Compressed Data File/Archive and Create Master Data File/Archive for Transmission steps.

Referring now to FIG. 6, which is a detail of the Create Compressed Data File/Archive 310 and Creating Master Data File/Archive for Transmission 340, the textual data is preferably archived to a single file at step 320, and then merged with user modified data at step 322. The file is compressed step 320 and packaged as a file containing decoded VIN data and user modified data at step 332. At step 350, the data file is combined with the image file(s) 350. The individual archive files and image files are collected at step 352 and compressed to a single archive file. The data collected will typically consist of textual information, such as the VIN, any edited data from the operator such as Make, Model, or Color, and Binary Image data. The textual information will preferably be recorded to a file, or sent as part of the communication header, body or footer. The Binary Image Data is preferably recorded to separate files, or sent as part of the communication header, body or footer in UUEncoded, Base64 Encoded, Un-Encoded, or Hexadecimal Representation. The data is preferably archived into a single entity and compressed using a Public Domain algorithm to speed transmission, especially in the case of files.

Figure 7:
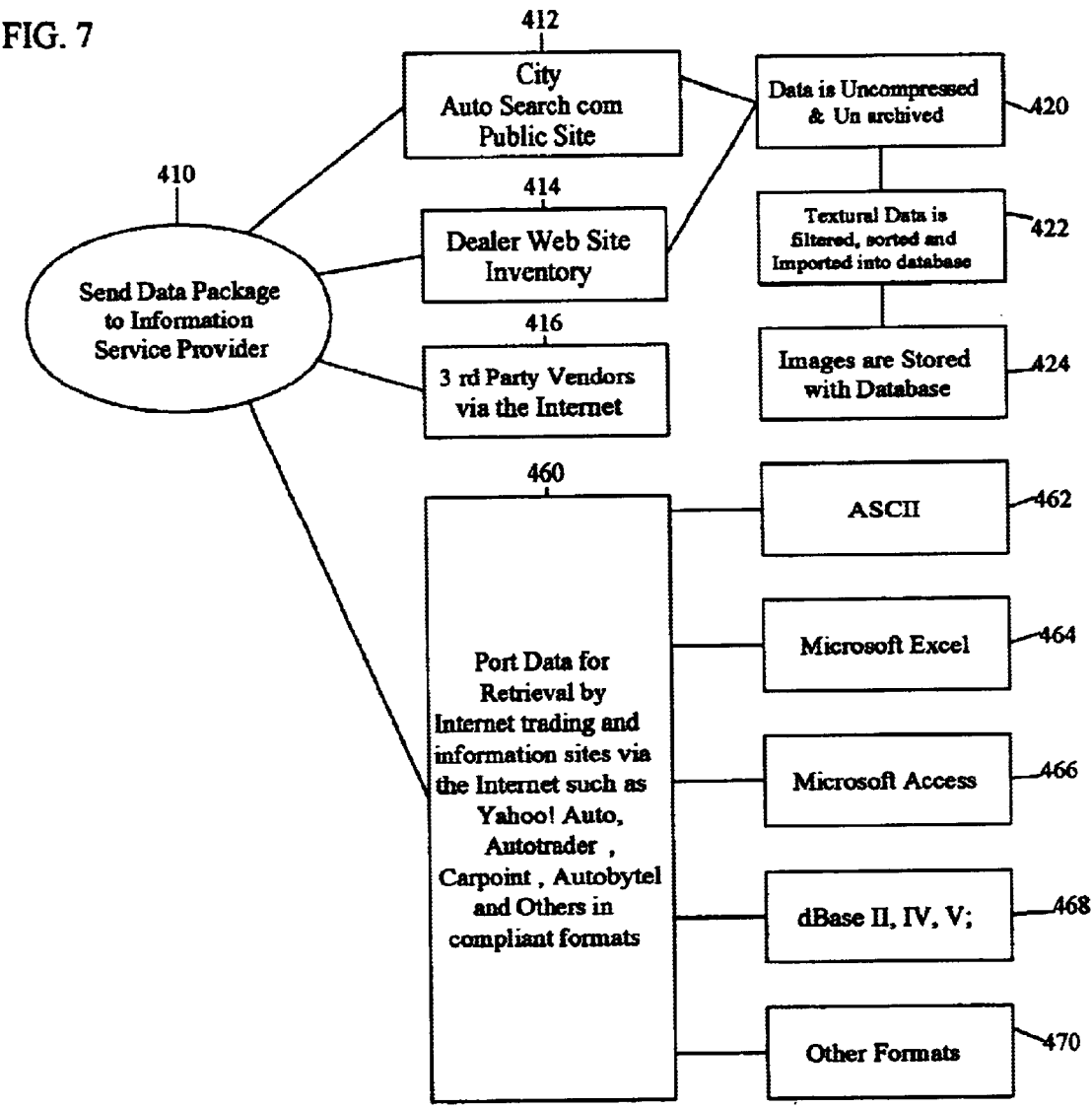
FIG. 7 is a detailed flowchart of the Send Data Package to Information Service Provider step.

Referring now to FIG. 7, which is a detail of the Send Data Package to Information 412, to a Dealer Web Site Inventory 414, and through the Internet to one or more Dealer Back Office System Vendor 416. For steps 412 and 414, the data is typically uncompressed and unarchived at step 420. The textual data is filtered, sorted, and input into databases at step 422. Images are stored in the database at step 424. The data is preferably transmitted in TCP Packets, routed via IP Addressing, over a standard Ethernet connection, out into the Internet via a DSL, Cable, ISDN, Fractional Tier, Full Teir Level(s), or any successful Internet connection and received via standard Internet networking. The data may also be transmitted in TCP Packets, routed via IP Addressing, tunneled through standard PPP, to an Internet Service Provider, out into the Internet and received via standard Internet networking. The data may also be transmitted in Protocol Packets or Data Stream via a modulated/demodulated signal over standard Telephone lines. As an alternative to step 416 of sending the data directly to Dealer Back Office System Vendors, the data may be posted to dealer's back office systems 460 in formats consistent with those systems such as ASCII 420, Microsoft Excel 464, Microsoft Access 466, dBase II, IV, or V 468, or other format 470. The $3^{rd}$-Party Vendor software may then retrieve the file(s) and update its database.

Figure 8:
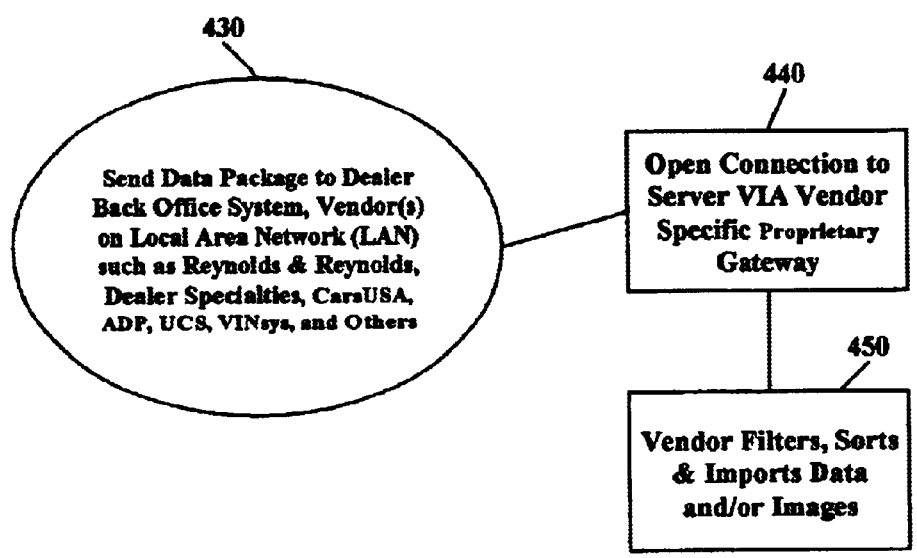
FIG. 8, is a detailed flowchart of the Send Data to Dealer Back Office System Vendor(s) step.

Referring now to FIG. 8, which is a detail of sending data to dealer (back-office systems) Vendor(s) on Local Area Network (LAN) in step 430, a connection is opened to a database server via a vendor specific proprietary gateway in step 440. The data is filtered, sorted, and transferred with or without images at step 450. At the request of the dealer, the data is typically transmitted to a $3^{rd}$-Part vendor's back-office system, such as provided by Reynolds & Reynolds, ADP, UCS, or EDS, or posted to a file accessible by such a vendor system. The format of the Data may be ASCII fixed or variable delimitation such as fixed width spaces/tabs or character (comma, space, pipe, etc.) delimited with data character qualifiers (double quotes, single quotes, pipes, etc.), Microsoft Excel format, DB, or any supportable format as suggested by the back-office systems vendor. The data is preferably archived into a single entity and compressed using a Public Domain algorithm to speed transmission, especially in the case of files. The data transmission is preferably facilitated through the Internet Wide Area Network (WAN), or a dealer's Local Area Network (LAN) to dealer Vendor(s). The WAN transmission will typically follow standard Internet communication procedures. Alternately, a LAN transmission will be dependent upon the capabilities of the $3^{rd}$-Party Vendor's system.

Once received by the $3^{rd}$-Party Vendor or the Information Service Provider, the Data is typically Filtered and Imported into a database. The Filtering Process typically consist of mapping data fields to table columns within the database, during which time data conversion look-ups may be necessary to maintain data integrity within the database. For Example, the "Make" of the vehicle may appear as "Ford", whereas "Ford" is stored in the database as a Manufacturer/Make ID of 14. The Filtering and Import Process is preferably facilitated by data processing programming or scripting languages such as Perl, Python, PHP, Visual Basic, VBScript, Java, Javascript, C, C++, in combination with action modules such as Stored Procedures, Jobs, Data Transformation Services/Wizards, and being called, initiated or included as CORBA Objects, COM Objects, or any other Object Oriented stylings, not to exclude or supercede Procedural Programming. One method is Visual Basic COM or Executables, in conjunction with a Microsoft SQL Server DTS Job using Stored Procedures to Filter, Import, Filter (if more), Validate and Commit the Data. The data is then made available for display on the world wide web through the dealer's own website, cityautosearch.com, and other online services from $3^{rd}$-Party Vendors.

Alternate Embodiment—Single Post Design

In this embodiment, a single post is provided, typically at the left or right front of the vehicle so that one or more pictures can be taken of the front and side of the vehicle. The post supports at least one camera which is in communication with a computer preferably positioned on a support shelf located on the post. A second shelf supports an optional printer or a desktop computer. The post also supports a bar code scanner which may be wired to the computer, or which may communicate wirelessly to the computer. The post is preferably adjustable in height to permit various camera angles.

Alternate Embodiment—Two Post Design

In this embodiment, two post are provided, typically at the left or right front of the vehicle and at the opposite rear corner of the vehicle so that one or more pictures can be taken of the front and one side of the vehicle, and that one or more pictures can be taken of the back and the other side of the vehicle. The first post supports at least one camera which is in communication with a computer preferably positioned on a support shelf located on the post. A second shelf supports an optional printer or a desktop computer. The post also supports a bar code scanner which may be wired to the computer, or which may communicate wirelessly to the computer. The post is preferably adjustable in height to permit various camera angles. The second post also supports at least one camera which is in communication with a computer. The posts are preferably connected by at least one conduit housing an electrical supply wiring and communications cables.

Alternate Embodiment—Handheld Camera

In this embodiment, no posts are provided, and the images are captured on a digital camera which is help by an operator. The automobile is preferably parked in a designated parking spot. The operator walks around the vehicle taking exterior shots from several, preferably predefined, positions such as drivers side, rear of vehicle, passenger side, and front. The operator may also take pictures of the interior of the vehicle if desired. In this embodiment, the pictures are preferably displayed on the camera so that the operator can accept an image before going to the next photographing location. Alternately, the operator may take a series of pictures which are downloaded and viewed on a computer monitor and either accepted or retaken. A computer workstation is preferably located near the designated parking spot. The operator preferably scans a bar-coded VIN number with either a wireless scanner communicating with the computer; or with a scanner directly connected to a port on the computer. The camera is in communication with the computer so that images are captured directly. The processing of the information proceeds as described in the embodiments above. The processing of the information occurs in real time, which is defined here as being within a few minutes of the start of the data acquisition process as contrasted by the several days required by prior art processes. The real time performance of the data acquisition provides both cost savings and dramatically reduced turn-around time relative to existing procedures.

Alternate Embodiment—Rolling Tripod Mounts with Drop Down Connections

In this embodiment, one or more camera mounts are provided on wheeled tripods that may be pushed to a desired location. Electrical power and communication cables are provided from above as drop-down connections Alternate Embodiment—Wire Guided Robotic Camera Mount In this embodiment, a guide wire is preferably buried in the floor around a vehicle work area. One or more motorized camera mounts travel around the floor above the wire path, stopping at various locations to acquire an image. At least one camera is mounted on each camera mount. If multiple cameras are used, they are preferably mounted at different heights to get different views of the vehicle. The camera mount drive mechanism is in wireless communication with the computer, and the computer provides instructions on the stopping location(s) for the camera mounts.

Alternate Embodiment—Robotic Camera Track

In this embodiment, a track is provided for a motorized camera mount similar to the above-described embodiment. One or more camera mounts are positioned within the track, and one or more cameras are supported on each mount. The camera mount drive mechanism may be controlled wirelessly, or by cable connection to the computer.

Alternate Embodiment—Elevated Camera Track

In this embodiment, the frame is comprised of one or more posts which support at least one elevated track provided above and around at least a portion of the vehicle so that the camera mount may be positioned at various locations around the vehicle. The positioning may be performed manually, through motorized wireless or with cabled camera mounts as described in previous embodiments. In cabled connections, the cable is supported by the track so that it remains above the ground and out of the way of ground personnel. This elevated configuration also permits the vehicle work center floor space to be used for other purposes. In an alternative elevated embodiment, the camera mounts are pivoted arms so that a track is not necessary.

Alternate Embodiment—Virtual Tour

In this embodiment, additional external and internal vehicle images are acquired so that the images can be presented to a potential customer in a manner that approximates walking around the vehicle to inspect it, and looking inside the vehicle. The additional images may be acquired from fixed post-mounted cameras, from one or more track-mounted cameras, or from one or more handheld cameras. The application software then permits the images to be presented in a slide show format in either a default order or in an order specified by the user. Internal vehicle images are typically obtained by providing supplemental lighting to the cameras and opening vehicle doors and/or windows to permit the cameras to focus on sections of the vehicle interior. This embodiment typically requires 15 or more images of the vehicle, and in the case of higher end vehicles, additional images may be desirable.

Alternate Embodiment—Fully Automated System

Figure 10:
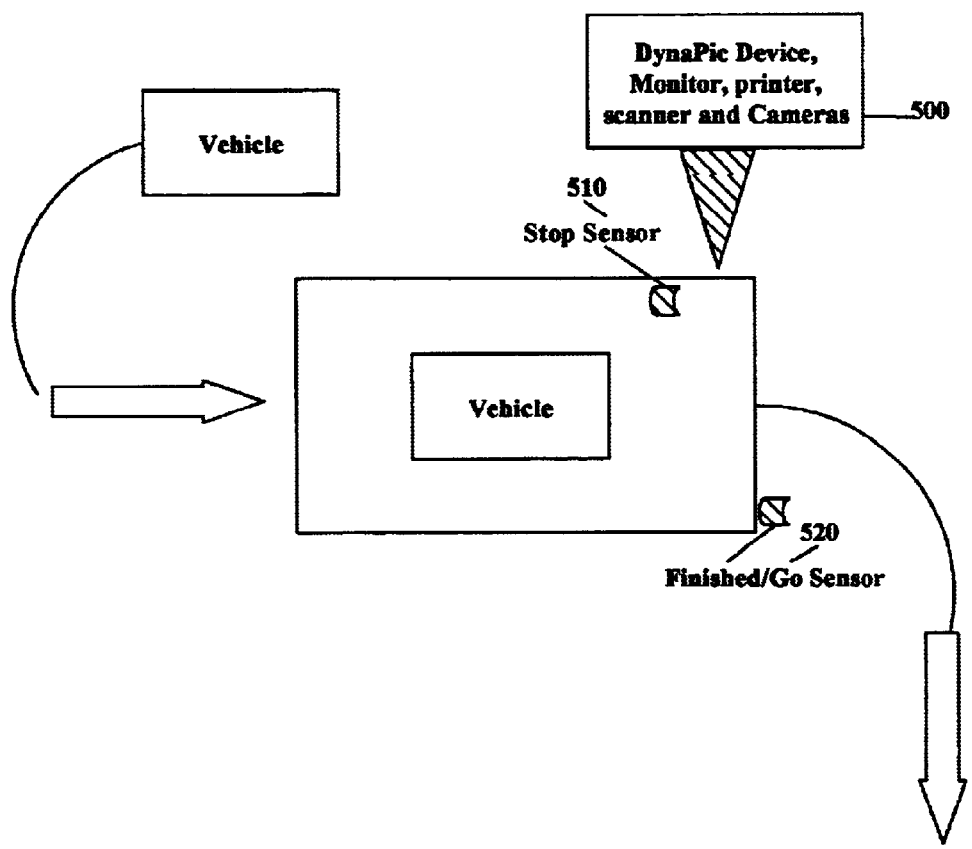
FIG. 10 is a schematic of a fully automated system.

Referring now to FIG. 10, a single driver/operator drives a vehicle 11 through a station having fixed cameras in an automated processing center 500. The driver preferably uses a bar scanner with a wireless connection to a computer to capture the bar code. A stop indicator 510 provides a signal for the driver to park temporarily as the images are acquired. When the image files are successfully created, a "go" indicator 520 is provided. In this manner, one or more drivers can process cars as quickly as the drivers can move the vehicles through the station.

Alternate Embodiment—Radio Frequency Identification

In this embodiment, a unique vehicle identification is obtained from a unique radio frequency identification devices which may be cross-referenced to additional information, such as maintained on a manufacturer's database. An operator can scan a passive device by passing a wireless or wired reader within a short distance of the device and obtaining the radio frequency device's identification. In other embodiments, a typically battery powered device can provide both an identification and additional information about the vehicle which is stored in a memory device. A fixed reader may also be used to obtain the RFID, so that the reader may be mounted near the vehicle.

Alternate Embodiment—Other Vin Identification Techniques

Other electronic techniques include radio transmittal of the VIN number, unique radio frequency identification devices which may be cross-referenced to additional information. One manual technique is keyboard entry on palm computer devices, preferably wirelessly communicating with the computer. Another manual technique is to have one operator calling out the VIN number to a second operator who enters the number through the computer keyboard. In the case of manual entry, it is desirable to determine data such as the year, make, model, etc. of the vehicle, and to have displayed that data on a computer in order to provide a partial confirmation that the accuracy of the VIN number.

Alternate Embodiment—Video Camera

An alternative to a digital camera is to use a video camera. In this embodiment, one or more video cameras are used to capture the digital images. The operator reviews the video clips, preferably on the computer monitor, and selects appropriate views of the vehicle for the images.

Alternate Embodiment—Handheld Data Collection

In this embodiment, a dedicated handheld data collection unit is used to capture the VIN and the images which are then downloaded over an Internet connection to a computer elsewhere.

Alternate Embodiment—Remote Processing

In this embodiment, the data acquisition software resides on a remote application server. In this case, the computer is the server which is accessed via the Internet or similar remote connection. The camera and the VIN reader are onsite, and feed their data directly over the remote connection in the application server for processing. A second computer, which serves as an Internet access terminal is present at the dealer site.

What is claimed is:

1. A vehicle identification center, the center comprising
   a frame including a plurality of camera mounting means, the frame defining an open area for positioning the vehicle within the frame;
   a plurality of digital cameras, such that at least one camera is mounted on each camera mounting means;
   a Vehicle Identification Number detection means; and
   a computer workstation, the workstation having a CPU, a monitor, and a keypad entry device.

2. The vehicle identification center of claim 1 wherein the Vehicle Identification Number detection means is a bar code scanner.

3. The vehicle identification center of claim 2 wherein the bar code scanner is connected to the computer workstation so that the Vehicle Identification Number may be read into the computer.

4. The vehicle identification center of claim 2 wherein the bar code scanner is wirelessly connected to the computer workstation so that the Vehicle Identification Number may be read into the computer.

5. The vehicle identification center of claim 2 wherein the bar code scanner is connected to a palm computer device so that the Vehicle Identification Number may be read into the palm computer device.

6. The vehicle identification center of claim 1 further comprising
at least one vehicle stop location indicator, such that the indicator provides an indication of the optimum stopping location for a vehicle in the vehicle identification center.

7. The vehicle identification center of claim 1 wherein the camera mounting means is an adjustable post including a height-adjustment means such that the height of the camera may be adjusted according to the type of vehicle in the vehicle identification center.

8. The vehicle identification center of claim 1 wherein the camera mounting means is a movable post, such that post has at least two wheels.

9. The vehicle identification center of claim 8 wherein the camera mounting means has a tripod base, such that the camera mounting means may be manually moved from one position to another position.

10. The vehicle identification center of claim 7 wherein the height-adjustment means is manually operated.

11. The vehicle identification center of claim 7 wherein the height-adjustment means is motorized and controlled by the computer workstation.

12. The vehicle identification center of claim 1 wherein the frame is comprised of a plurality of posts and conduit connecting each post to at least one other post.

13. The vehicle identification center of claim 1 wherein the frame is comprised of at least one post and an elevated track such that the post supports the elevated track and the camera mounting means is supported by the elevated track.

14. The vehicle identification center of claim 13 wherein the camera mounting means are movable along the elevated track.

15. The vehicle identification center of claim 1 wherein the cameras are live feed digital cameras.

16. The vehicle identification center of claim 9 wherein the camera images are displayed on the computer monitor.

17. The vehicle identification center of claim 1 wherein the computer workstation is a notebook computer.

18. The vehicle identification center of claim 1 wherein the computer workstation is a palm computer.

19. The vehicle identification center of claim 1 wherein the camera mounting means are robotically controlled from the computer workstation such that the computer workstation may issue a command to move the camera mounting means from a first position to a second position.

20. A vehicle identification center, the center comprising
a frame, the frame comprising
a first adjustable-height front post, the first post including a computer work surface, a first digital camera mount, and an electrical connection from the first camera mount to the computer work surface, a second adjustable-height front post, the second post including a second digital camera mount, and an electrical connection from the second camera mount to the computer work surface, a third adjustable-height rear post, the third post including a third digital camera mount, and an electrical connection from the third camera mount to the computer work surface, the third post including a pair of wheels which permit movement of the third post, and such that the electrical connection of the third post is an adjustable-length connection between the first post and the third post, and a fourth adjustable-height rear post, the fourth post including a fourth digital camera mount, and an electrical connection from the fourth camera mount to the computer work surface, the fourth post including a pair of wheels which permit movement of the fourth post, and such that the electrical connection of the fourth post is an adjustable-length connection between the second post and the fourth post, the first post, second post, third post, and fourth post thereby defining corners of a rectangular working area such that an automotive vehicle may be positioned within the working area;

a vehicle stop location indicator attached to the frame, such that the indicator provides an indication of the optimum stopping location for a vehicle in the vehicle identification center; a computer workstation, such that the computer workstation may be placed on the computer work surface, the computer workstation having a CPU, a monitor, and a keypad entry device;

four digital cameras, such that a camera is mounted on the digital camera mount of each post, such that each camera is connected to the computer workstation so that the monitor will display the camera images; and a bar code scanner for reading the vehicle's Vehicle Identification Number, such that the bar code scanner is connected to the computer workstation.

21. A vehicle identification center, the center comprising
a means for mounting a digital camera at each of the four corners of a rectangular working space;

a means for adjusting the height of each digital camera;

a means for displaying the images from the digital cameras;

a means for focussing the image from each digital camera;

a means for accepting the image of each camera into a computer database;

a means for indicating the appropriate positioning of a vehicle in the working space; and a means for obtaining the Vehicle Identification Number (VIN) of the vehicle and recording the VIN into a computer database.

22. A vehicle identification center, the center comprising
a means for mounting a digital camera at any of the four corners of a rectangular working space;

a means for adjusting the height of each digital camera;

a means for displaying the images from each digital camera;

a means for focussing the image from each digital camera;

a means for accepting the image of each digital camera into a first computer file;

a means for indicating the appropriate positioning of a vehicle in the working space;

a means for obtaining the Vehicle Identification Number (VIN) of the vehicle and recording the VIN into a second computer file;

a means for consolidating the first computer file and the second computer file into a single computer file stored on a first computer; and a means for transferring the single computer file to a second computer.

* * * * *